Figure 6:
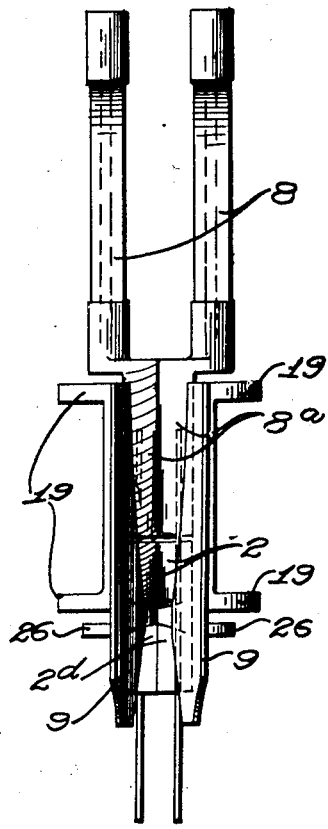

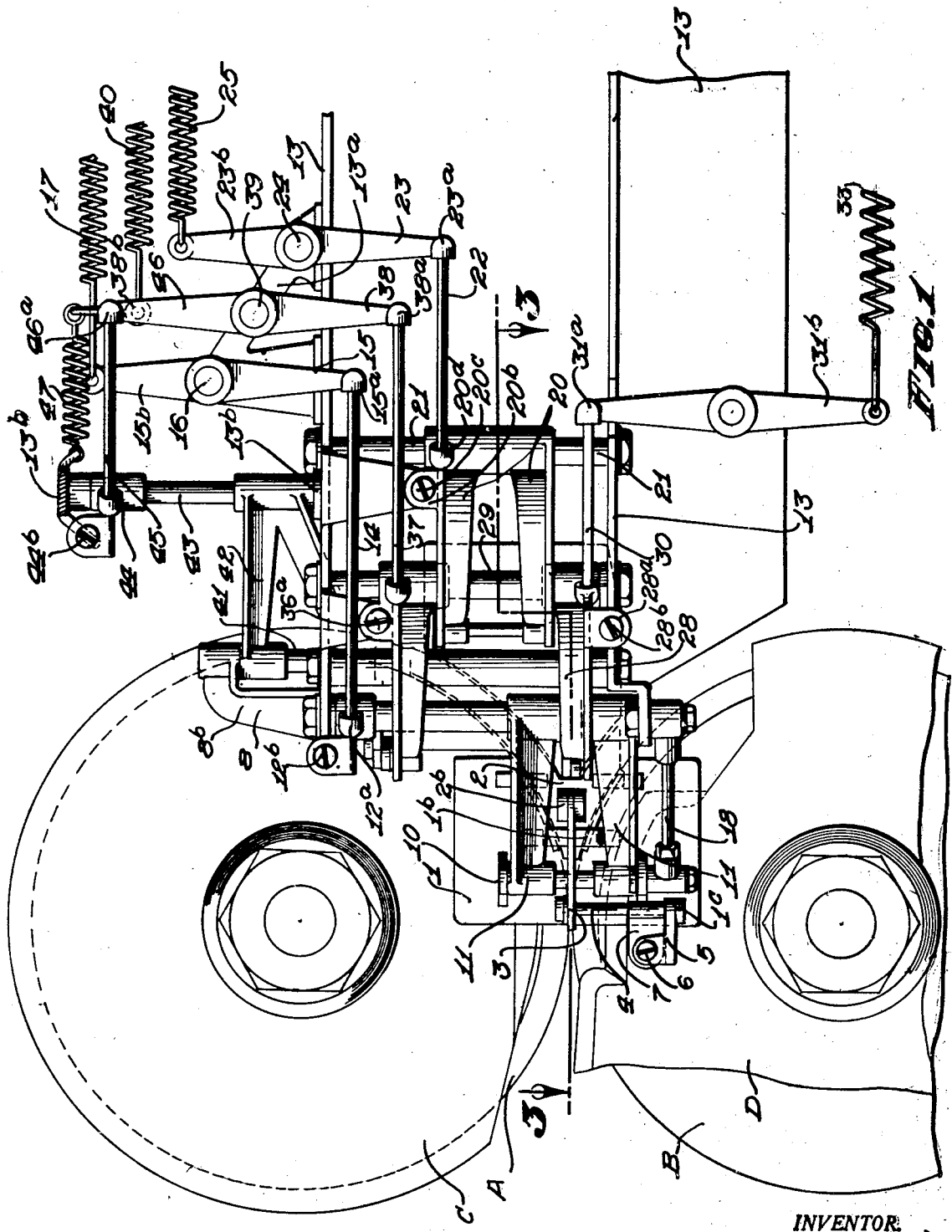

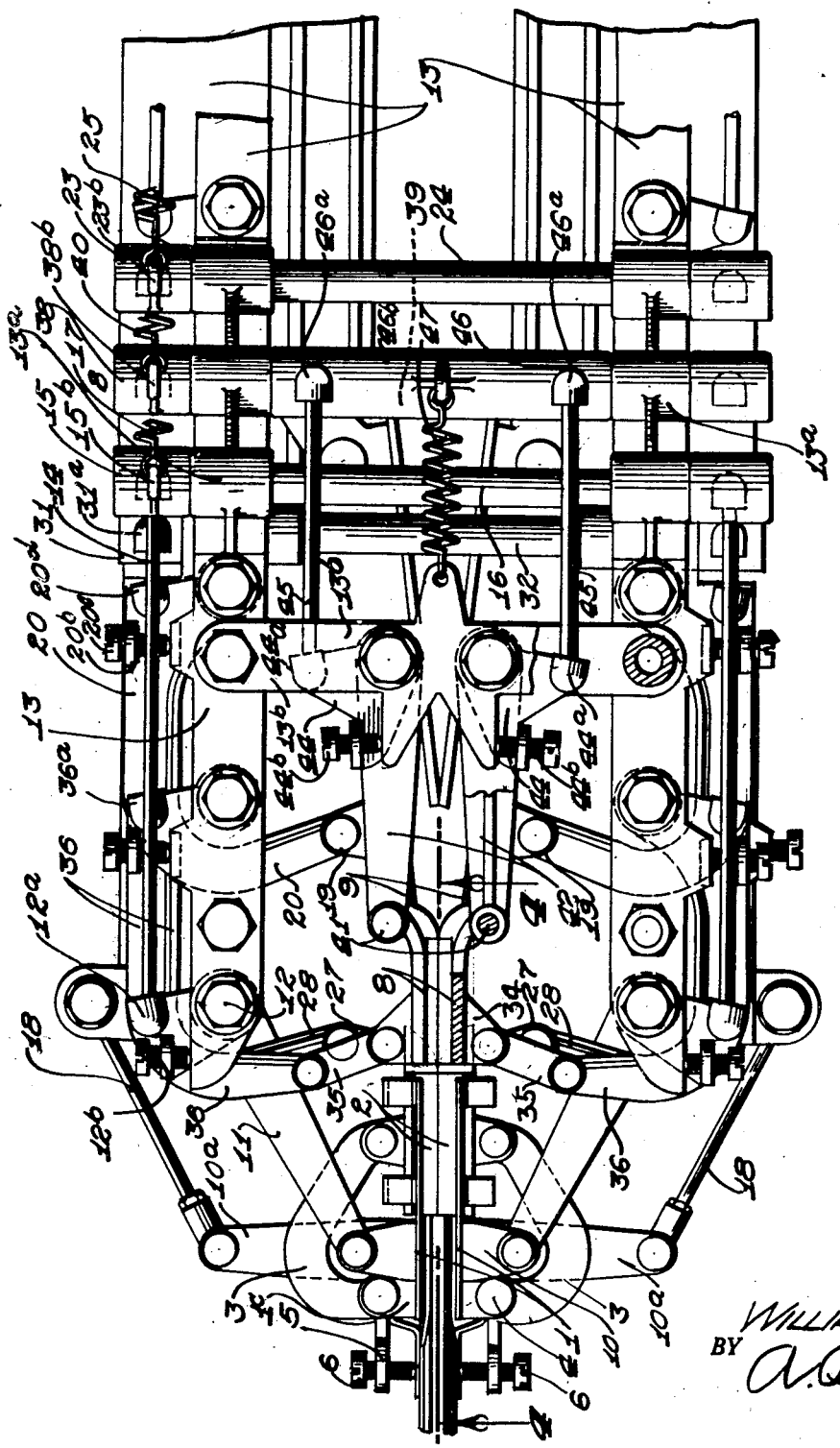

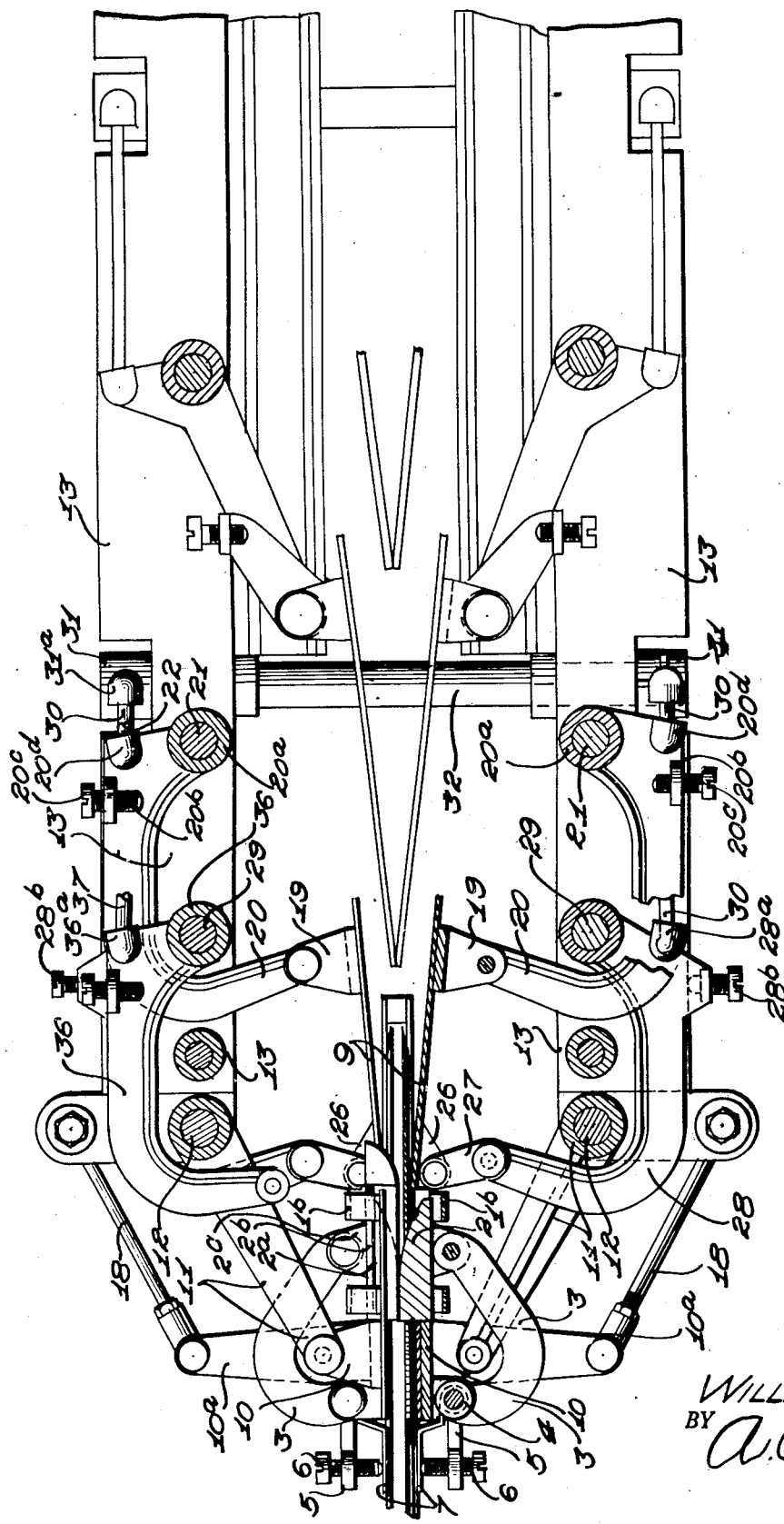

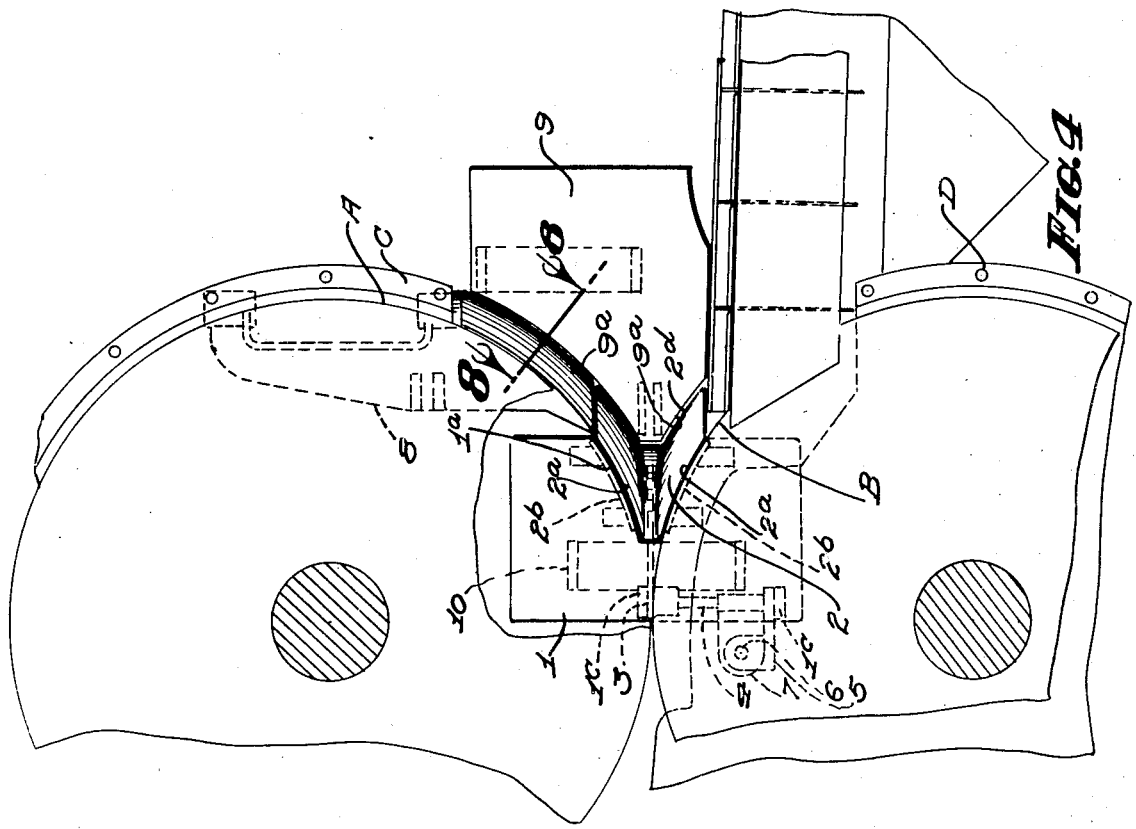

Patented Nov. 20, 1934

1,981,552

UNITED STATES PATENT OFFICE 1,981,552

FISH FINAL-POSITIONING MEANS

William H. Hunt, National City, Calif.

Application October 6, 1930, Serial No. 486,545

4 Claims. (Cl. 17—3)

My invention relates to fish final positioning means, and the objects of my invention are:

First, to provide a means which is adapted for use in connection with fish filleting machines;

Second, to provide a means of this class which is particularly adapted to function in conjunction with my fish filleting machine shown and described in my co-pending applications; namely, Fish bone removing machines, Serial Number 381,833, which has matured into Patent No. 1,861,-863, dated June 7, 1932; Fish preliminary positioning means, Serial Number 478,079; Fish dorsal fin centering means, Serial Number 496,210, which has matured into Patent No. 1,889,919, dated December 6, 1932; and Fin and tail guide means, Serial Number 508,899, which has matured into Patent No. 1,885,829, dated November 1, 1932;

Third, to provide a means of this class which accurately centers and guides a fish, whereby the backbone of short fish may pass between pairs of closely spaced cutting blades adapted to cut flesh therefrom;

Fourth, to provide a means of this class which takes advantage of the fact that the sides of a fish are symmetrical with respect to its backbone, so as to automatically center the fish;

Fifth, to provide a means of this class comprising a plurality of fish fin and side engaging members so arranged that they exert pressures upon the fish commensurate with the portion thereof engaged, that is, the members while engaging the delicate tail fin press lightly so as not to crumple it, and while engaging the sides of the fish, press with sufficient force to hold the fish in position while being cut;

Sixth, to provide a means of this class which does not readily clog or jam;

Seventh, to provide a means of this class which shields the cutting blade of the filleting machine so as to make it practically impossible for the operator's hand to accidentally engage the cutting blade;

Eighth, to provide an apparatus of this class which is readily assembled and disassembled for cleaning and the like, thereby providing an apparatus which may be maintained in a sanitary condition; and Ninth, to provide on a whole a novelly constructed fish final positioning means for filleting machines, which is simple of construction proportional to its functions, durable, efficient in its actions, and which will not readily deteriorate or get out of order.

Figure 7:
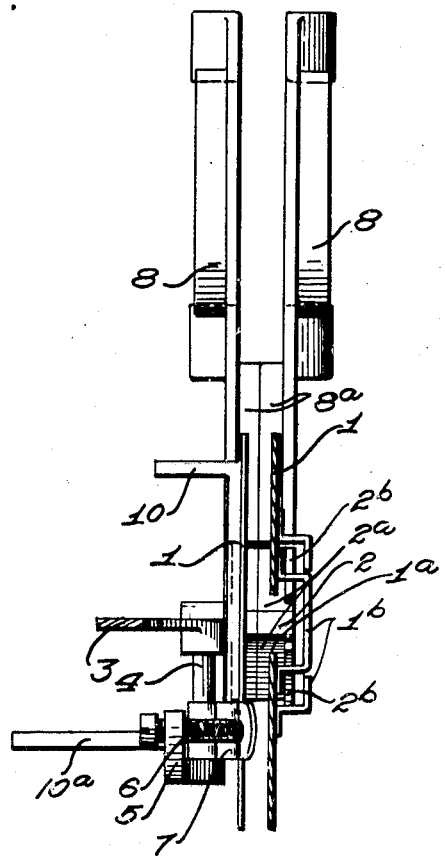
Figure 8:
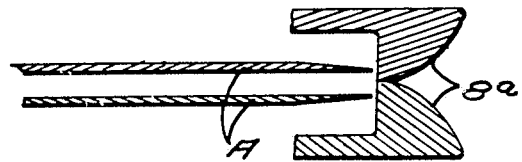

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a side elevational view of my fish final positioning means with adjacent portions of a filleting machine shown fragmentarily and in outline; Fig. 2 is a plan view of my fish final positioning means with parts and portions shown in section and with adjacent portions of the filleting machine shown fragmentarily and in outline; Fig. 3 is a slightly enlarged sectional view through 3—3 of Fig. 1, with parts and portions shown in elevation, and adjacent portions of the filleting machine shown fragmentarily and in outline; Fig. 4 is a fragmentary elevational view of my fish final positioning means showing the side engaging plates or members with the operating mechanism therefor omitted, and showing adjacent portions of the filleting machine fragmentarily and in outline; Fig. 5 is a perspective view showing the parts illustrated in Fig. 4; Fig. 6 is a rear elevational view of the several side engaging plates and members, with the supporting and operating mechanism omitted; Fig. 7 is a similar front elevational view thereof; and Fig. 8 is a fragmentary, enlarged sectional view through 8—8 of Fig. 4.

Similar characters of reference refer to similar parts and portions throughout the several views of the drawings.

Exit plates 1, tail fin directing members 2, links 3, shafts 4, arms 5, set screws 6, bearing flaps 7, upper guide members 8, entrance plates 9, brackets 10, arms 11, shafts 12, framework 13, link rods 14, equalizer arms 15, equalizer shaft 16, spring 17, link members 18, brackets 19, arms 20, shafts 21, link rods 22, equalizer arms 23, equalizer shaft 24, spring 25, brackets 26, links 27, arms 28, shafts 29, link bars 30, equalizer levers 31, shaft 32, springs 33, brackets 34, link members 35, arms 36, link bars 37, equalizer levers 38, equalizer shaft 39, spring 40, journal pins 41, double levers 42, shafts 43, lever arm 44, link rod 45, equalizer levers 46, and spring 47 constitute the principal parts and portions of my fish final positioning means.

My fish final positioning means is primarily adapted for use in conjunction with my fish filleting machine, shown and described in my co-pending applications referred to in the second object of this patent application.

The portions of my fish filleting machine associated particularly with the means herein shown and described comprise two pairs of revoluble, annular cutting wheels or blades A and B. The members of each pair of cutting blades are arranged in slightly spaced relation to each other, and are as thin as possible. The upper cutting blades A are normally substantially tangent to the peripheries of the lower cutting blades, and are mounted so that they may rise slightly. The lower pair of blades B is adapted to cut or gash a fish on opposite sides and close to its dorsal fins and to its backbone. The upper pair of blades A is adapted to cut along the front side of the fish on opposite sides of the belly, fins and backbone. The tail fin passes between the two sets of blades with the other fins. Other means, not shown, severs the remaining portions of the fillets and the fins and bones pass on between the blades.

The two pairs of cutting blades are covered as much as possible by shield plates C and D.

The function of my fish final positioning means is to center or position the fish relative to these cutting blades so accurately that the cutting blades snugly receive the fins and tail between them.

Two exit plates 1 are provided, which are mounted on the outer sides of the cutting blade shields C and D. These exit plates are roughly rectangular with their forward sides approximately flush with a plane between the axes of rotation of the two pairs of cutting blades, and their rear portions covering the entering edges of said cutting blades.

At its rear edge, each exit plate 1 is provided with a substantially V-shaped cut or notch 1a, the side walls of which are arcuate and conform approximately to the peripheries of the two pairs of cutting blades A and B, as shown in Figs. 1 and 4.

Slidably mounted in the notched portion 1a of each exit plate, so as to move laterally with respect to the cutting blades, is a pair of tail fin directing members 2. Each of these members is provided with arcuate upper and lower edges 2a which conform to the arcuate sides of the corresponding notch portion 1a. These arcuate edges 2a are adapted to barely clear the periphery of the cutting blade, as shown best in Figs. 4 and 5. The two tail fin directing members are normally in contact with each other, as shown in Figs. 6 and 7, and overhang or shield the entering edges of the cutting blades.

The tail fin directing members 2 are limited in their inward movement with respect to their corresponding exit plates 1 by means of ridges 2b along the outer margins of the edges 2a. Their outward movements are limited by retaining brackets 1b secured to the exit plates 1, as shown best in Fig. 3.

Each tail fin directing member 2 is provided with a bracket 2c extending outwardly therefrom, which is pivotally connected to the one end of a link 3, which extends forwardly and is joined to the upper end of a vertically disposed shaft 4. The shafts 4 are supported along the forward portions of the exit plates 1 by bearings 1c.

Secured to each shaft 4 is a short forwardly extending arm 5, the extended end of which clears the corresponding exit plate 1. Each arm 5 is provided at its extended end with a set screw 6, which extends towards the adjacent cutting blade shield D. Loosely supported upon the shaft 4 is a flap 7, which extends forwardly out from the exit plates so as to fit between the set screw and the cutting blade shield D, as shown best in Figs. 1, 3, and 5, so that the sides of a fish passing therebetween will not catch on the set screws 6.

The two tail fin directing members 2 have roughly the outline of an arrowhead with the apex or point thereof extending forwardly into the corresponding notch 1a. The rear or entering end of each tail fin directing member is notched, as indicated by 2d, the side walls of which follow a curve concentric with the edges 2a.

When the two tail fin directing members are touching each other, their only portions of contact are along their margins adjacent the arcuate edges 2a and across the blunt point connecting these edges at their forward extremities. From these V-shaped contacting portions, the directing members curve outwardly and away from each other to the rear edges, which are relatively thin. The inner walls of the directing members thus converge from their receiving to their discharging ends so as to guide the tail fins between the cutting blades.

The upper and lower portions of the tail fin directing members extend rearwardly from the arcuate edges 2a. Said lower portions terminate contiguous to the discharge end of a fish fin and tail guide means, described in my co-pending application, Serial Number 508,899, now Patent Number 1,885,829, dated November 1, 1932.

Arranged above and rearwardly of the tail fin directing members, forming continuations thereof, and conforming to the curvatures of the upper cutting blades A, are guide portions 8a of upper guide members 8. The rear margins of the guide portions contiguous to the cutting blades are normally in contact with each other, while the opposite or rear inner marginal portions thereof are spaced apart so that the inner sides of the guide portions 8a converge from their rear to their forward sides, as shown best in Fig. 8. The upper guide members are adapted to move inwardly and outwardly across the periphery or edge of said cutting blades.

The upper guide members 8 project upwardly from their guide portions 8a and along the outer sides of the shield plates C, as shown best in Figs. 1, 2, 4, and 5.

Arranged rearwardly of the tail fin directing members 2 and the guide portions 8a of the upper guide members 8, is a pair of entrance plates 9. These plates are substantially flat, and are mounted so that they converge towards their forward ends. Their forward upper and lower edges 9a follow the curvature of the rear edges of the tail fin directing members and guide portions, and are contiguous thereto, as shown best in Fig. 4.

Each of the exit plates 1, upper guide members 8, and entrance plates 9 is supported independently of the other members and arranged to move only in planes substantially parallel with the axes of the cutting blades, that is, movement laterally across the edges or peripheries of said blades. The mechanism for accomplishing this is shown best in Figs. 1, 2, and 3.

With regard to the exit plates 1, said exit plates are provided with brackets 10, which extend outwardly therefrom near the upper and lower margins, to which are secured the forward ends of a pair of arm members 11. These arms extend rearwardly and outwardly, and are secured to a common shaft 12, which is supported by framework 13 of the filleting machine. At the upper end of each shaft 12, there is provided a short arm, terminating in a socket 12a, which loosely receives the forward end of a link rod 14.

The short arm supporting the socket 12a is provided with an offset lug portion containing a set screw 12b. Said set screw is adapted to engage a portion of the framework 13 and limit the inward movement of the exit plate associated therewith.

The link rod 14 extends rearwardly and horizontally from the socket 12a and fits loosely in a socket 15a. The sockets are deep enough to retain the link bar even when they are separated to the extremities of their movements.

The equalizing lever 15 for each exit plate is connected to a common shaft 16. The shaft 16 extends across the top of the framework 13 through bearings formed in multiple bearing brackets 13a which are supported on the framework 13.

One of the equalizing levers 15 is provided with an upwardly extending arm 15b, to which is attached a spring 17.

Action of the spring 17 through the shaft 16, arms 15, rods 14, shaft 12, and arms 11, causes equal force to be exerted on the two exit plates so that movement of one exit plate against the action of the spring 17 allows the other exit plate to move freely. Its movement is equal to that of the first moved exit plate. Thus, when the two plates are equally distant from a centered plane passing between the members of each pair of cutting blades, the tension applied thereto is the same.

One of the brackets 10 of each exit plate is extended, as indicated by 10a. Pivotally secured at this extended portion is a link member 18, which passes rearwardly therefrom. The rearward end of the link member 18 is rotatably secured to a portion of the framework 13. The two link members 18 and their corresponding arms 11 and their connections with the bracket 10 and framework 13 define opposite side and corners of parallelograms whereby the exit plates are retained in planes substantially parallel with the centered plane of the machine.

Each entrance plate 9 is provided with a bracket 19 on the outer side thereof near its rear end portion, which is rotatably secured to the forward or extended ends of a pair of arms 20. These arms are bent to escape other mechanism, and are rigidly secured to a common sleeve 20a, which, in turn, is journalled about a vertical axis upon a shaft 21 supported by the framework 13. One of the arms 20 is provided with a lug 20b, in which is mounted a set screw 20c, which is adapted to bear against a portion of the framework 13 and limit the inward movement of the corresponding exit plate 9.

Also provided on each of the upper arms 20 is a socket 20d, which receives the forward end of a short, horizontally extending link rod 22, the rear end of which fits in the lower end of a socket 23a provided at the lower end of an equalizer lever 23. The equalizer lever 23 connected with each entrance plate 9 is secured to a common shaft 24, which is journalled in bearings provided in the bearing brackets 13a below and to the rear of the shaft 16. One of the equalizer levers 23 is provided with an upwardly extending arm 23b, to which is attached the one end of a spring 25, the other end of which is anchored to any suitable means, not shown.

The forward ends of the entrance plates 9 are likewise provided with brackets, designated 26. Rotatably secured to each bracket 26 is a short link member 27, the extended end of which is rotatably connected to the extended end of an arm member 28. The arm member 28 is curved to avoid other mechanism, and its supported end is journalled about a shaft 29. Near the supported end of the arm 28 is provided a socket portion 28a, which loosely receives the forward end of a link bar 30. The link bar 30 extends rearwardly from the socket along the lower portion of the framework 13. The rear end of said link bar fits into a second socket 31a provided at the extended end of an equalizer lever 31. The two equalizing levers, one for each entrance plate, are joined to a common shaft 32, which is supported by the lower portion of the framework 13, as shown best in Figs. 1 and 3.

One of the levers 31 is provided with a downwardly extending arm 31b, to which is attached the one end of a spring 33, the other end of which is anchored to any suitable means, not shown. The tendency of the spring is to yieldably force the forward ends of the entrance plates towards each other. This movement is limited by set screws 28b, one supported by each of the arms 28, said set screws engaging portions of the framework 13.

Forwardly of the upper extremities of each guide portion 8a of each upper guide member 8, is an outwardly extending bracket 34, to which is rotatably secured a short link member 35. Each link member is, in turn, rotatably secured to the extended forward end of an arm 36, which passes clear of the shaft 12 and is rotatably secured to a shaft 29. Near its secured end each arm 36 is provided with a socket 36a, which receives the forward end of a link bar 37, the rear end of which fits in a socket portion 38a at the lower end of an equalizer lever 38. The two equalizer levers 38, corresponding to the two upper guide members 8, are secured to a common shaft 39, which extends across the upper portion of the framework 13 near the equalizer shafts 16 and 24. One of the levers 38 is provided with an arm 38b, which is secured to the forward end of a spring 40, the other end of which is anchored to any suitable means, not shown.

The upper guide members 8 project above their guide portions 8a, and form yokes 8b for receiving vertically positioned journal pins 41. The journal pin 41 of each upper guide member 8 is journalled on the extended ends of a double lever 42. Each double lever 42 is secured to a vertically positioned shaft 43 mounted upon a bridge 13b extending between the upper portions of the framework 13. The upper portion of each shaft 43 is provided with a lever arm 44, having a socket 44a at its extremity, which receives the forward end of a link bar 45. Each link bar extends rearwardly from its socket 44a. The rear end of each link bar 45 fits in a socket 46a provided at the upper end of an equalizer lever 46, one equalizer lever being provided for each upper guide member. These levers are joined to a common sleeve 46b, which is journalled on the equalizer shaft 39. Connected with the equalizer levers 46, is a spring 47, which is anchored to a portion of the framework 13. The lever arm 44 is provided with an extension which receives a set screw 44b adapted to engage a portion of the framework 13 and limit inward movement of the upper guide members 8.

Continuing from the entrance plates 9, are a series of rectangular plates similarly supported, which form a part of my fish preliminary positioning means described in my co-pending application, Serial Number 486,545.

Operation of my fish final positioning means is as follows:

The fish enters between the entrance plates 9, tail first and back down. The wedge-like spaces between the pairs of guide portions 8a and the tail fin directing members direct the tail of the fish between the blades A and B. As the fish moves forwardly through the blades, the sides of the fish force the members 1, 2, 8, and 9 outwardly with respect to the longitudinal axis or backbone of the fish. When any pair of these members is equally spaced outwardly from a center line extending between the several cutting blades, the pressures thereon are equal, but should they be off center one direction or the other, the side furthest in is free to move out until equal with the member on the opposite side. Thus, by reason of the fact that the sides of a fish are symmetrical with respect to its backbone, the several side engaging members 1, 2, 8, and 9 press equally on both sides of the fish and accurately center it relative to the cutting blades.

As the set screws 6, through the bearing flaps 7, normally rest against the shields D, which are fixed, they function as fulcrum points. Thus, outward movement of the tail fin directing members causes a relatively small outward movement of the exit plate through the equalizing mechanism (included in members 11 to 16) against the spring 17. Due to the great leverage had by the tail fin directing members against the spring 17, very little pressure is required to move said directing members outwardly. Thus, the delicate tail of the fish passes between the tail fin directing members rather than crumpling. After the fins are once in, the movements of the tail fin directing members are limited by the brackets 1b, and further expansion by reason of the increased width of the fish causes said directing members to move as one with the exit plates. The exit plates, having less leverage, exert an increased resistance to movement, sufficient to keep the fish centered.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

I claim:

1. In a fish final positioning means for fish filleting machines, the combination with two pairs of cutting blades arranged above and below the line of travel of a fish through said filleting machine and adapted to slit a fish along its back and belly and on opposite sides of its back, belly and tail fins, of a pair of fish side engaging means arranged adjacent the entering edges of said cutting blades and on the outer sides thereof, and fish tail fin directing members shiftably supported by each of said fish side engaging means, said directing members arranged to overhang the entering edges of said cutting blades.

2. In a fish final positioning means for fish filleting machines, the combination with two pairs of cutting blades arranged above and below the line of travel of a fish through said filleting machine and adapted to slit a fish along its back and belly and on opposite sides of its back, belly and tail fins, of a pair of fish side engaging means arranged adjacent the entering edges of said cutting blades and on the outer sides thereof, fish tail fin directing members shiftably supported by each of said fish side engaging means, said directing members arranged to overhang the entering edges of said cutting blades, equalizing means for said fish side engaging means, yieldable means for causing mutual approachment of said fish side engaging means, and link and lever means joining said directing members to said fish side engaging means for applying the action of said yieldable means to said directing member in a lesser amount than applied to said fish side engaging means.

3. In a fish final positioning means for fish filleting machines, the combination with two pairs of cutting blades arranged above and below the line of travel of a fish through said filleting machine and adapted to slit a fish along its back and belly and on opposite sides of its back, belly and tail fins, of a pair of fish side engaging means arranged adjacent the entering edges of said cutting blades and on the outer sides thereof, fish tail fin directing members shiftably supported by each of said fish side engaging means, equalizing means for said fish side engaging means, yieldable means for causing mutual approachment of said fish side engaging means, and link and lever means joining said directing members to said fish side engaging means for applying the action of said yieldable means to said directing members in a lesser amount than applied to said fish side engaging means.

4. In a fish final positioning means for fish filleting machines, the combination with two pairs of cutting blades arranged above and below the line of travel of a fish through said filleting machine and adapted to slit a fish along its back and belly and on opposite sides of its back, belly and tail fins, of a pair of fish side engaging means arranged adjacent the entering edges of said cutting blades and on the outer sides thereof, fish tail fin directing members shiftably supported by each of said fish side engaging means, said directing members arranged to overhang the entering edges of said cutting blades, equalizing means for said fish side engaging means, yieldable means for causing mutual approachment of said fish side engaging means, and tension means joining said directing members to said fish side engaging means arranged and constructed for applying the action of said yieldable means to said directing member in a lesser amount than that applied to said fish side engaging means.

WILLIAM H. HUNT.